United States Patent
Pitsch

[19]

[11] Patent Number: 6,164,550
[45] Date of Patent: Dec. 26, 2000

[54] FAULT DETECTION AND MODIFICATION CIRCUIT

[75] Inventor: Robert Alan Pitsch, Carmel, Ind.

[73] Assignee: Thomson Licensing S.A., Boulogne Cedex, France

[21] Appl. No.: 09/091,443

[22] PCT Filed: Dec. 17, 1996

[86] PCT No.: PCT/US96/19928

§ 371 Date: Jun. 19, 1998

§ 102(e) Date: Jun. 19, 1998

[87] PCT Pub. No.: WO97/23840

PCT Pub. Date: Jul. 3, 1997

Related U.S. Application Data

[60] Provisional application No. 60/009,178, Dec. 22, 1995.

[30] Foreign Application Priority Data

Jan. 2, 1996 [GB] United Kingdom .................... 9600002
Jun. 28, 1996 [GB] United Kingdom .................... 9613608

[51] Int. Cl.$^7$ ..................................................... G06K 19/06
[52] U.S. Cl. ........................... 235/492; 235/441; 235/438
[58] Field of Search .................................... 235/380, 437, 235/438, 441, 492; 327/180, 309, 318, 327

[56] References Cited

U.S. PATENT DOCUMENTS

| | | | |
|---|---|---|---|
| 4,785,166 | 11/1988 | Kushima | 235/441 |
| 4,864,541 | 9/1989 | Marquot | 365/185 |
| 4,990,760 | 2/1991 | Tomari et al. | 235/492 |
| 5,034,599 | 7/1991 | Hirata | 235/438 |
| 5,359,291 | 10/1994 | Dommerich, III | 324/523 |

FOREIGN PATENT DOCUMENTS

| | | |
|---|---|---|
| 265312 | 4/1988 | European Pat. Off. . |
| 341712 | 11/1989 | European Pat. Off. . |
| 363871 | 4/1990 | European Pat. Off. . |
| 61-289480 | 12/1986 | Japan . |
| 62-282389 | 12/1987 | Japan . |
| 2-135589 | 5/1990 | Japan . |

OTHER PUBLICATIONS

Patent Abstracts of Japan, vol. 12, No. 173, May 24, 1988 & JP 62–282389.
Patent Abstracts of Japan, vol. 11, No. 153, May 19, 1987 & JP 61–289480.
Patent Abstracts of Japan, vol. 14, No. 369, Sep. 9, 1990 & JP 2–135589.

*Primary Examiner*—Michael G Lee
*Assistant Examiner*—Diane I. Lee
*Attorney, Agent, or Firm*—Joseph S. Tripoli; Robert D. Shedd; Frank Y. Liao

[57] ABSTRACT

A circuit in a smart card reader to detect when a variation in a power supply provided to a smart card has occurred, indicating a possible fault in the smart card. As an example, the circuit detects this variation by determining when the power supply has dropped below a reference voltage. If this happens, the circuit will modify the smart card control signals, for example, by clamping them at or near ground potential, thereby preventing any possible damage to either the smart card or the smart card reader.

8 Claims, 4 Drawing Sheets

| CONTACT NO. | ASSIGNMENT | CONTACT NO. | ASSIGNMENT |
|---|---|---|---|
| C1 | VCC (SUPPLY VOLTAGE) | C5 | GND (GROUND) |
| C2 | RST (RESET SIGNAL) | C6 | VPP (PROGRAMMING VOLTAGE) |
| C3 | CLK (CLOCK SIGNAL) | C7 | I/O (DATA INPUT/OUTPUT) |
| C4 | RESERVED TO ISO/IEC JTC 1/SC 17 FOR FUTURE USE | C8 | RESERVED TO ISO/IEC JTC 1/SC 17 FOR FUTURE USE |

FAULT DETECTION AND MODIFICATION CIRCUIT

This application claims the benefit of U.S. Provisional Ser. No. 60/009,178 filed Dec. 22, 1995.

The present invention relates generally to access control systems including an integrated circuit (IC) card, or "smart" card, for limiting access to information in signal processing application. More particularly, the present invention relates to a smart card reader operation when a fault is detected.

Systems such as pay-TV systems include access control sub-systems that limit access to certain programs or channels. Only users who are entitled (e.g., paid a fee) are permitted to view the programs.

Access control systems may include an integrated circuit (IC) card, or "smart" card, feature. A smart card is a plastic card the size of a credit card that has a signal processing IC embedded in the plastic. A smart card is inserted into a smart card reader that couples signals to and from the IC in the card. The IC in a smart card processes data such as security control information as part of an access control protocol. The IC includes a control microcomputer, such as the 6805 processor from Motorola Semiconductor, Austin, Tex., which includes ROM, EEPROM, and RAM memory. The processor performs various security control functions including entitlement management and generating a key for descrambling the scrambled data component of the signal.

Sometimes, the various contacts on the smart card may be shorted together by debris or by malfunctioning of the smart card circuitries. For example, debris can accumulate on the contacts of a smart card during manufacturing, shipment, user replacement or wiping action of the smart card. This shorting of the smart card contacts will, in turn, short the smart card power supply or present a low impedance to the power supply, causing it to go into a current limiting condition. If the signals to the card are not turned off or modified immediately, large current from the control lines could be coupled into the smart card, causing destruction. This may damage the circuitries in both the smart card and the smart card reader.

In accordance with an aspect of the present invention, a circuit is provided to detect when a variation in a power supply coupled to a smart card reader has occurred, indicating a possible fault in the smart card (e.g., shorted contacts or other malfunctions). As an example, the circuit detects this variation by comparing the voltage coupled to smart card with a reference voltage. If the circuit detects that the voltage has dropped below the reference voltage, it will modify the smart card control signals, for example, by clamping them at or near ground potential. This prevents any potential damage to either the smart card or the smart card reader.

The invention may be better understood by referring to the accompanying drawing in which.

Figures 1A, 1B:
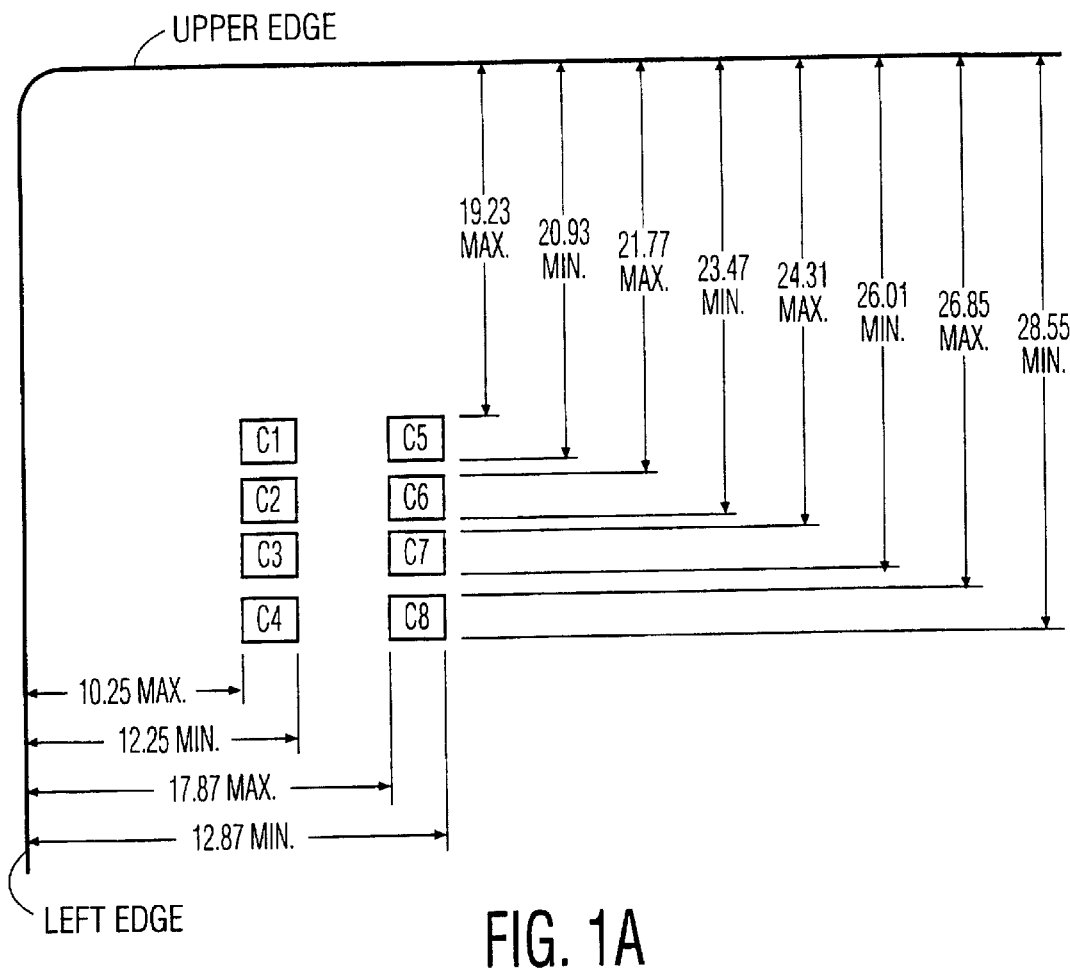
FIG. 1A shows the physical layout of the contacts of an exemplary smart card as defined by the current ISO standard 7816.
FIG. 1B shows the contact and signal assignments of an exemplary smart card as defined by the current ISO standard 7816.

International Standards Organization (ISO) standard 7816 establishes specifications for a smart card interface. In particular, the ISO standard 7816-2 specifies that the electrical interface to the card will be via eight contacts positioned on the card surface as shown in FIG. 1A. Six of the eight signals at the contact points are defined as Vcc (supply voltage), RST (reset signal), CLK (clock signal), GND (ground), Vpp (programming voltage for programming memory in the card IC), and I/O (serial data input/output). Two contacts are reserved for future use. The assignment of the signals to the smart card contacts is shown in FIG. 1B.

Figure 2:
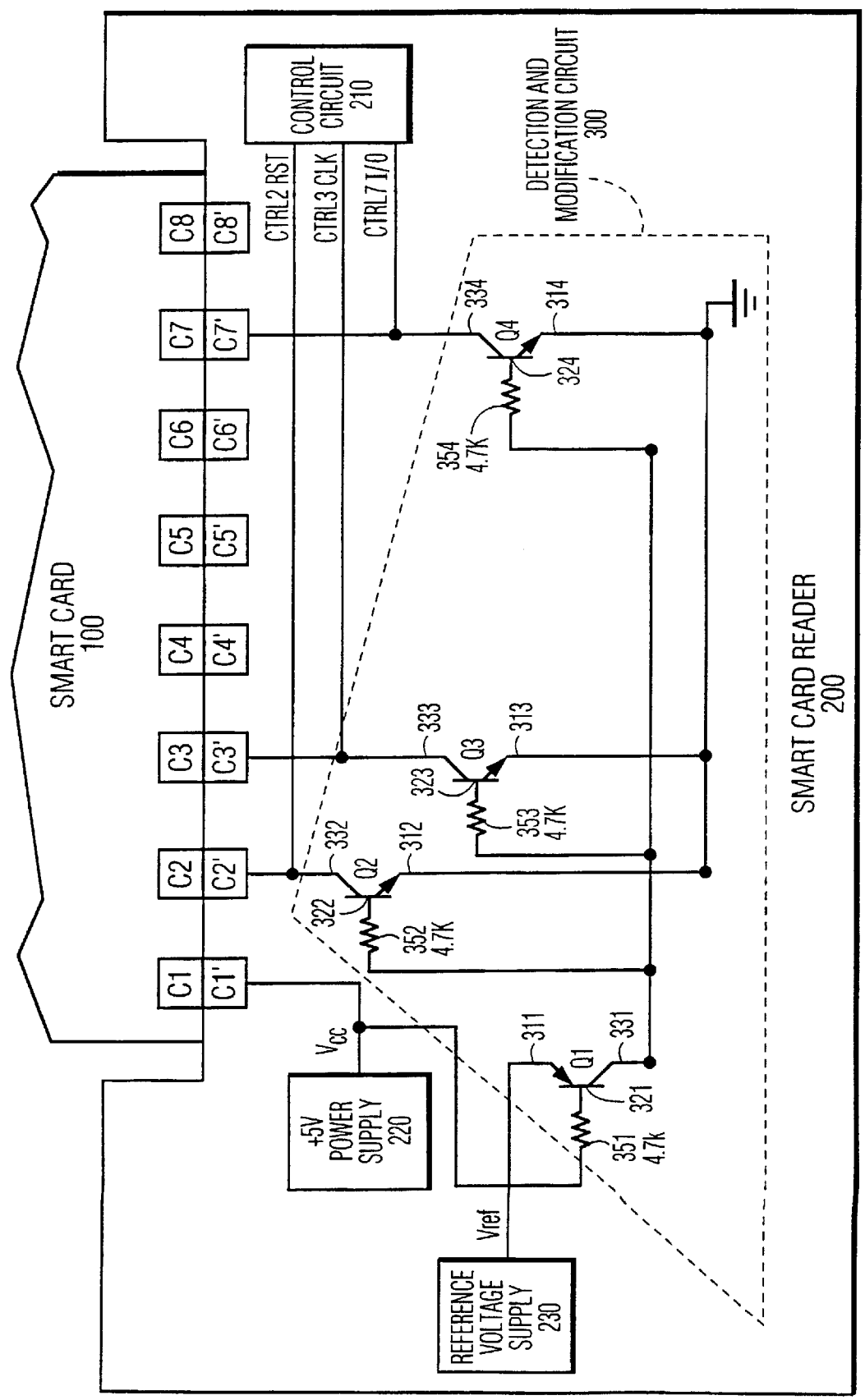
FIG. 2 shows an exemplary embodiment of the current invention as employed in a smart card reader.

FIG. 2 shows an exemplary embodiment of the present invention. An ISO 7816 compliant smart card 100 having eight contacts C1–C8 is shown coupled to and communicating with a smart card reader 200. Again, the definitions and assignments of the contacts C1–C8 of the smart card 100 are shown in FIG. 1B.

The smart card reader 200 illustrated in FIG. 2 also has eight contacts C1'–C8', which have the same assignments and definitions as shown in FIG. 1B. In particular, contact C1' of the smart card reader 200 is the Vcc contact for providing a power supply voltage to the smart card.

In the present exemplary embodiment, the power supply is a regulated +5 V supply 220.

In addition, contacts C2', C3' and C7' are presented with respective control signals RST, CLK and I/O data from a control circuit 210. These control signals pass to or from the contacts via control lines CTRL2, CTRL3, and CTRL7. The control circuit 210 under the supervision of a microprocessor (not shown) selectively provides the proper signals to the smart card, according to the desired application and design requirements. For example, when necessary, the microprocessor may command the control circuit 210 to send a reset signal RST through the control line CTRL2 to contact C2'. This would allow the smart card 100 to be reset. Note that although only three control lines are shown in FIG. 2 for illustrative purposes, one skilled in the art can readily appreciate that additional control lines may be similarly utilized in the future for conducting signals to or from the smart card 100.

The detection and modification circuit 300 of the present invention comprises a detection transistor Q1. Q1 in the present embodiment is a PNP bipolar transistor such as a 2N3906 transistor made by Motorola. The emitter terminal 311 of Q1 is connected to a reference voltage supply 230. In this embodiment, the reference voltage is pre-calibrated to have the same potential as the Vcc supply voltage, +5v. The base terminal 321 of Q1 is connected to one end of a 4.7 KOhm base resistor, 351. The other end of the resistor 351 is connect to the output Vcc of the power supply 220. This allows detection transistor Q1 to monitor the power supply 220 as will be made clear later.

Each of the control lines CTRL2, CTRL3, and CTRL7 is connected respectively to one of the collector terminals 332–334 of clamping transistors Q2, Q3 and Q4. The clamping transistors Q2, Q3, and Q4 in the present embodiment are NPN bipolar transistors such as model BC546B made by Motorola. Each of the base terminals 322–324 of the clamping transistors Q2–Q4 are each coupled to one end of a 4.7 KOhm resistor 352–353. The other ends of the resistors 352–353 are connected to the collector terminal 331 of the detection transistor Q1. All of the emitter terminals of Q2–Q4 are grounded.

The function of the detection and shut down circuit 300 will now be described. The function of the detection portion of the circuit 300 is to detect a variation of the supply voltage Vcc. It has been recognized by the inventor that when a short or current limiting condition exists in the power supply of the smart card reader, the output voltage will vary. In particular, the output will drop below the normally intended Vcc (i.e., +5V in our embodiment). Q1, in our example, is constantly monitoring the Vcc output at its base terminal 321. When the voltage output Vcc drops more than 0.6 volt below the preselected reference voltage, transistor Q1 will turn on.

Once transistor Q1 turns on, current also flows through the base terminals 322–324 of clamping transistors Q2–Q4 in the modification portion of the circuit 300. This will in turn cause each of the clamping transistors Q2–Q4 to turn on, thereby clamping the control lines CTRL2, CTRL3 and CTRL7 to be at or near ground potential (i.e., Vce saturation voltage, typically at 0.005–0.2 v). This modifies the voltages on the control lines and effectively shut them down, thus preventing any potential damage to any circuitries in either the smart card or the smart card reader.

Figure 3:
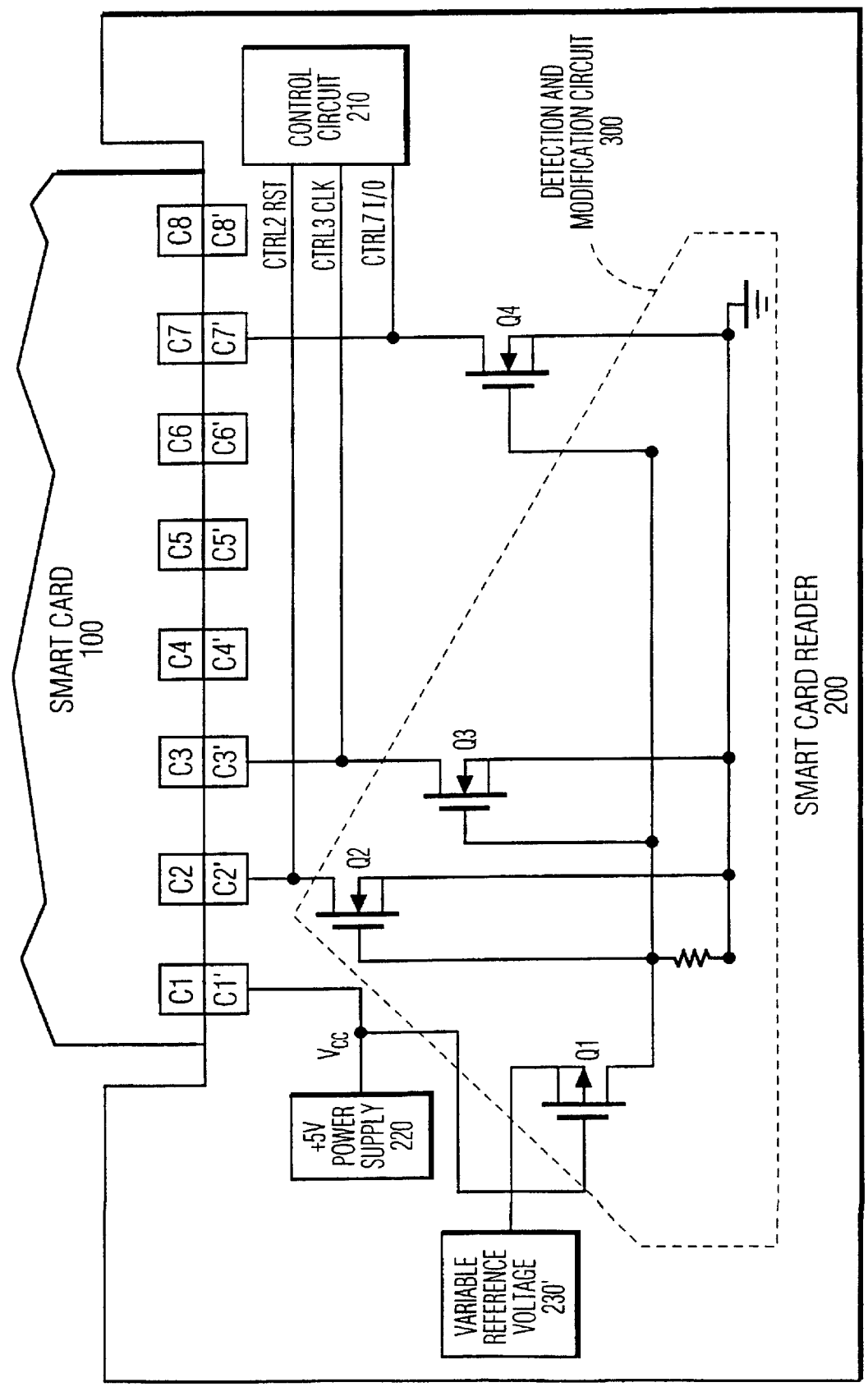
FIG. 3 shows another embodiment of the present invention using Field Effect Transistors (FETs).

FIG. 3 shows another embodiment of the present invention. In this embodiment, the detection and modification circuit 300 comprises Field Effective Transistors (FETs), instead of bipolar transistors. This embodiment is especially advantageous if circuit 300 is implemented as a part of an Integrated Circuit (IC). In addition, the reference voltage supply 231' shown in FIG. 3 is now variably adjustable. This allows an user to adjust, depending on the design requirements, the reference voltage at which the detection transistor Q1 and the clamping transistors Q2–Q4 will be turned on.

Figure 4:
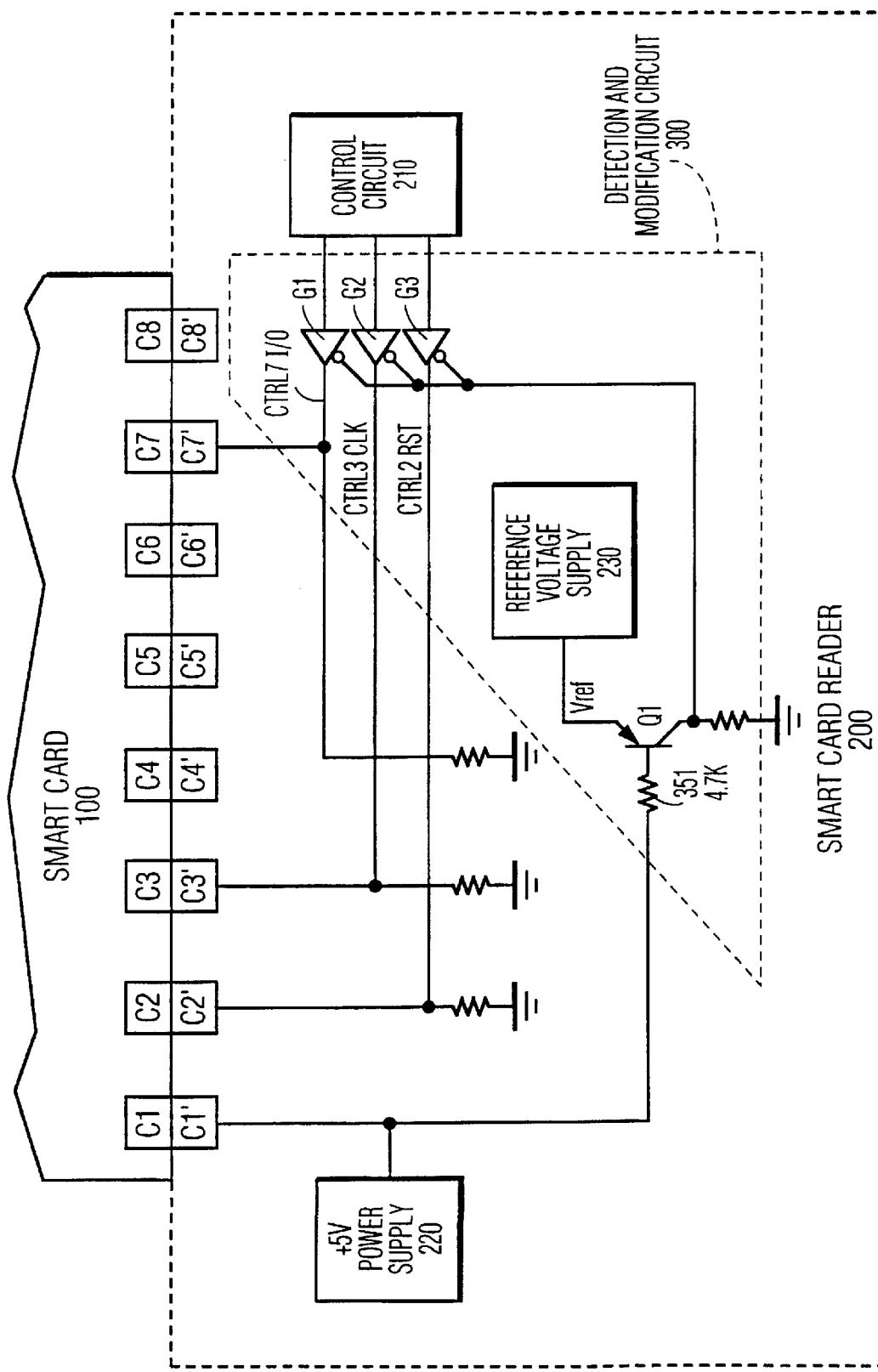
FIG. 4 shows another embodiment of the present invention using transmission gates to isolate the control lines to the smart card.

FIG. 4 shows another embodiment of the present invention. In this embodiment, the modification portion of the circuit 300 comprises transmission gates G1–G3. These transmission gates G1–3 are controlled by detection transistor Q1. When Q1 detects that the power supply 220 drops below a reference voltage Vref, Q1 will cause the transmission gates G1–G3 to isolate the control signals from the contacts C2', C3' and C7'.

It will be apparent to those skilled in the art, that although the invention has been described in terms of specific examples, modifications and changes may be made to the disclosed embodiments without departing from the essence of the invention. For example, although the present invention is described mainly using ISO complaint embodiments, it can clearly be employed in any smart card related systems, include a non-standard system. It is, therefore, to be understood, that the appended claims are intended to cover all modifications which naturally flow from the foregoing treatise and examples.

What is claimed is:

1. A smart card reader, comprising:

control means having a signal line for providing a control signal to a smart card;

detection means, independent of said control means, for detecting a variation in a supply voltage provided to said smart card;

clamping means, coupled to said signal line, for clamping said signal line to substantially ground potential, when said detection means determines that said supply voltage drops below a reference voltage, without intervention of said control means.

2. The smart card reader of claim 1, wherein said reference voltage is preset to a value less than said supply voltage.

3. The smart card reader of claim 1, wherein said clamping means is coupled to said detection means.

4. The smart card reader of claim 3, wherein said clamping means comprises a transistor.

5. The smart card reader of claim 4, wherein said detection means comprises a transistor.

6. A method of protecting a smart card by a smart card reader, comprising the steps of:

providing a plurality of control signals to said smart card from a control means;

detecting, independent of the control means, a variation in a supply voltage provided to the smart card;

clamping said signal line to substantially ground potential, when said detection means determines that the supply voltage drops below a reference voltage, without intervention of said control means.

7. The method of claim 6, wherein said detecting step further comprising the step of presetting said reference voltage to a value less than said supply voltage.

8. A smart card reader having a signal line for providing a signal to a smart card, said smart card reader comprising:

detection means for detecting a variation in a supply voltage provided to the smart card; and clamping means, coupled to the signal line, for clamping the signal line to substantially ground potential, when said detection means determines that said supply voltage drops below a reference voltage.

* * * * *